Nov. 30, 1943.  R. S. KOONCE  2,335,517
APPARATUS FOR LOADING HEAVY SPOOLS
Filed Jan. 16, 1939  2 Sheets-Sheet 1
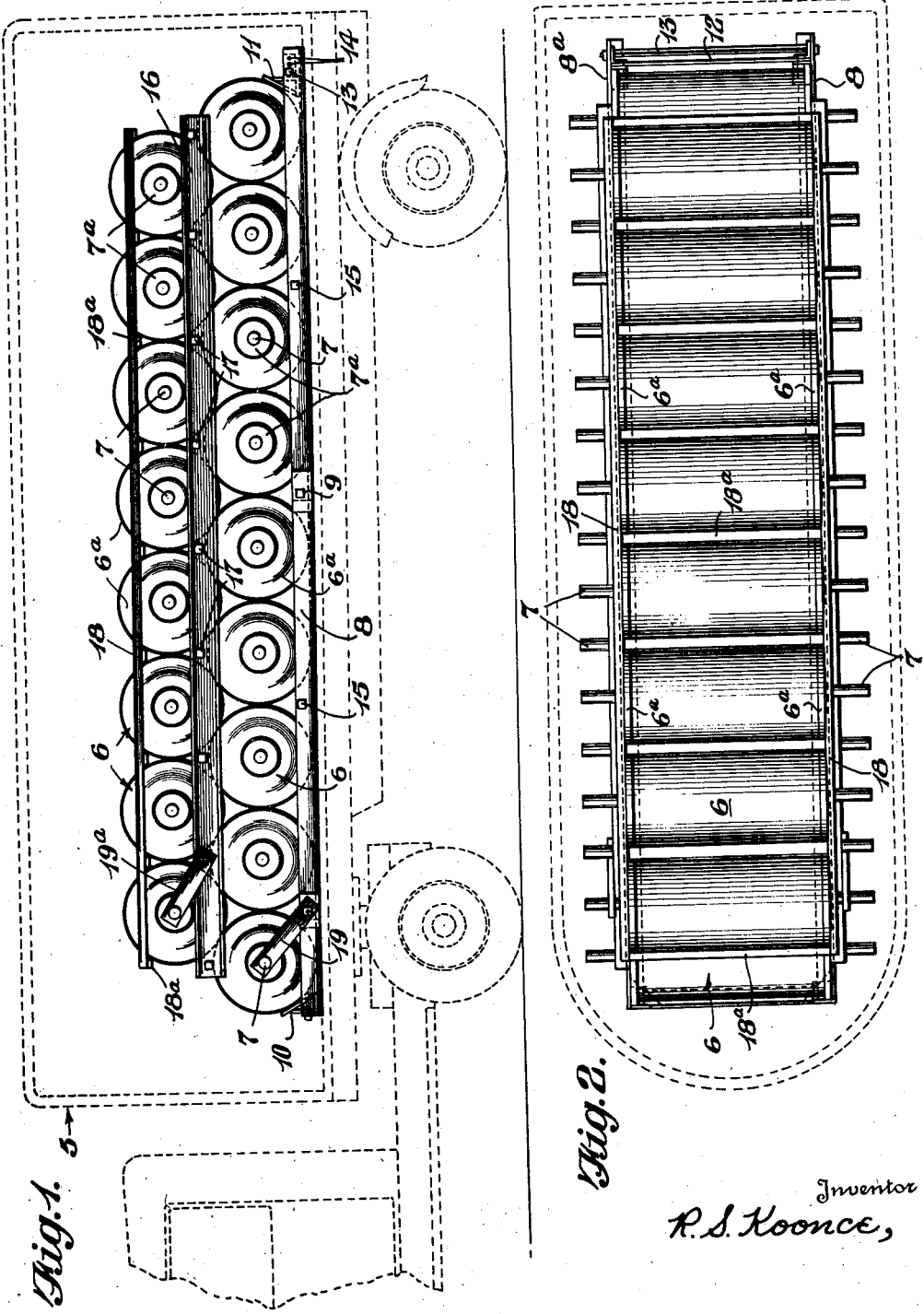
Inventor
R. S. Koonce,
By
Attorney Nov. 30, 1943. R. S. KOONCE 2,335,517
APPARATUS FOR LOADING HEAVY SPOOLS
Filed Jan. 16, 1939 2 Sheets-Sheet 2
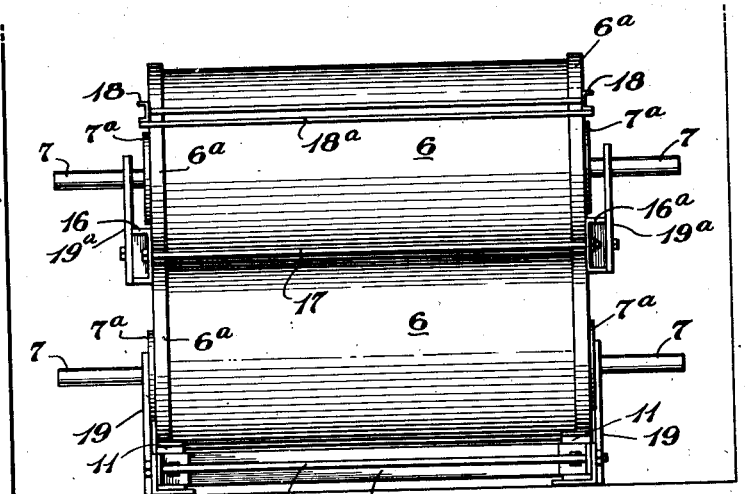
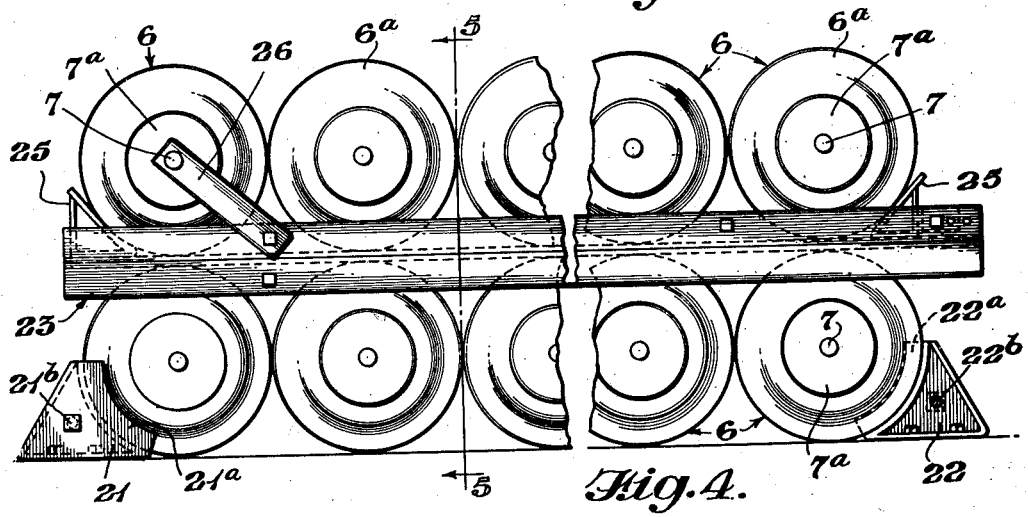
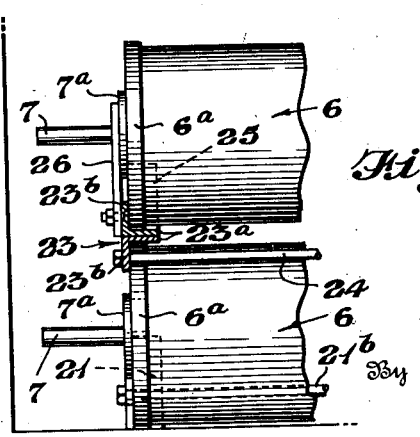
Inventor
R. S. Koonce,
By A. Yates Dowell
Attorney Patented Nov. 30, 1943

2,335,517

UNITED STATES PATENT OFFICE 2,335,517

APPARATUS FOR LOADING HEAVY SPOOLS

Richard S. Koonce, Raleigh, N. C., assignor to Atlantic States Motor Lines, Inc., High Point, N. C.

Application January 16, 1939, Serial No. 251,235

3 Claims. (Cl. 214—10.5)

This invention relates to a method of and apparatus for loading and stacking for transportation large spools of thread or cord and similar shaped objects.

In my copending application, Serial Number 238,691, filed November 3, 1938, now Patent No. 2,144,600, granted January 17, 1939, I have disclosed a method and apparatus which has been used successfully in transporting large spools of rayon tire cord from the rayon manufacturer to the consumer or tire manufacturer. Spools of the type under consideration wound with rayon tire cord weigh approximately one thousand pounds each, and if the spools shift during transportation the cord is crushed or bruised, necessitating returning of the spool for rewinding.

In the attempt to solve the problem of stacking and securing the spools so as to obtain maximum load capacity and yet avoid shifting and resultant damage to the cord, I eventually settled on the method and apparatus disclosed in my application above noted. However, in experimenting with various types of stacking apparatus, I found that other types could also be used in a practical and satisfactory manner, and the present application is a disclosure of such constructions.

The primary object of the present invention therefore is to provide a method of and apparatus for stacking and securing relatively large heavy spools and similar shaped objects in a manner such as to avoid shifting and resultant damage to the contents of the spools during transportation. More specifically, the invention is concerned with the loading, stacking and securing for transportation spools of cord or thread and which is susceptible of bruising and damage when the edge of one spool strikes and rides upon the body portion of another spool.

The foregoing and other objects and advantages of the invention will become apparent in view of the following description taken in conjunction with the drawings, wherein:

Fig. 1 is a view in side elevation of spool stacking and securing apparatus embodying the features of the present invention shown loaded with a series of spools on a truck body, the latter being illustrated in dotted lines;

Fig. 2 is a plan view of Fig. 1; and

Fig. 3 is an end view thereof.

Fig. 4 is a view in broken side elevation of a type of stacking and securing apparatus constructed in a manner such that bottom tracks or like supports may be omitted;

Fig. 5 is a section taken on the line 5—5, Fig. 4, but showing only one side portion of the apparatus.

Referring to the drawings in detail, and first to the type of apparatus shown in Figs. 1, 2 and 3, the vehicle used in transporting the spools or warp beams in the present instance is a truck or trailer body generally indicated at 5, although obviously the load could be placed on a car body or any other transporting apparatus capable of carrying the same. The spools are indicated at 6 and are each formed with end flanges 6a which retain the thread or cord on the spools. Spindles 7 project through the spools and serve as a mounting means during the winding and unwinding of the cord. End plates 7a, preferably of metal, surround the spindles and form a reinforcement at this point.

The spools are stacked on racks or frames devised in a manner such as to facilitate loading, and after loading and stacking, serve to retain the spools in a compact non-displaceable unit.

The frame construction as illustrated in Figs. 1, 2 and 3 comprises a base made up of tracks 8 and 8a, which may consist of angle shapes or irons having base flanges on which the flanges 6a of the spool roll and come to rest and substantially vertical side flanges which engage the opposite ends of the spools and prevent lateral shifting movement thereof. The tracks as illustrated are made up of series of sections bolted together at 9. At the rear end of the track are chocks 10 and at the front or loading end of the track are chocks 11 which are mounted on a cross member 12. These chocks serve as a means for holding the spools against rolling movement. The cross member 12 is adjustably mounted on a cross rod 13, which may be inserted in any one of a series of holes 14 so that the chocks 11 may be removed until the lower roll of spools is loaded, after which they may be applied and adjusted to the proper position. A series of cross or tie rods 15 connect the tracks 8 and 8a so that after the spools are stacked, these rods may be tightened up to bring the vertical flanges of the tracks snugly against the opposite ends of the spools.

(In referring to the "front" and "rear" of the framework, the end of the frame which lies at the front of the truck body is considered the rear end, and the opposite end of the frames, or the end through which loading takes place, is considered the front end.)

After the bottom row has been loaded, or during the process of loading the bottom row, an upper row of spools may be applied on the lower row of spools as best illustrated in Fig. 1. Each of the spools of the upper row are disposed between two spools of the bottom row, or are staggered with respect to the spools of the bottom row, after which side clamps in the form of channel beams 16 and 16a are positioned against opposite ends of the spools of both rows longitudinally of the load. The flanged ends of the spools of the upper row rest directly on the flanged ends of the spools of the bottom row. These side clamping beams are provided with a series of cross tie rods 17, the opposite ends of which terminate in the channels of the clamping beams 16 and 16a. When these tie rods 17 are tightened, the side clamping beams 16 and 16a are brought firmly into clamping engagement with adjacent portions of the upper and lower rows of spools, preventing lateral displacement thereof as well as longitudinal movement.

As a further assurance against longitudinal rolling movement or displacement in a longitudinal direction of the upper row of spools, means in the form of a rack 18 is provided consisting of a pair of side members, shown as of channel shape, having a series of cross connecting members 18a spaced so as to engage between each adjacent pair of spools, note particularly Fig. 1.

It sometime happens during hauling of the load that when the truck or car used in transporting the load is stopped or started suddenly, the end spools of the rows have a tendency to "jump" the end chocks. To ensure against such action, means in the form of latches or tie rods 19 and 19a are pivotally connected respectively to the bottom tracks 8 and 8a and the side clamping members or beams 16 and 16a with their upper ends adapted to engage over the spindle 7 of the respective end spools, note particularly Fig. 1.

One method of carrying out the loading and stacking operation is to roll the bottom row of spools on to the tracks 8 and 8a, then chock the bottom row; after which the upper row of spools is disposed in staggered relation to the bottom row, the side clamping beams then applied and tightened down, the top rack then placed over the top row of spools, and finally the latches 19 and 19a connected to the end spools. This frame structure serves to not only facilitate loading, but holds the spools together in a compact and non-displacement unit.

In Figs. 4 and 5 the arrangement is such that a base track may be dispensed with. In this instance, the lower row of spools are simply rolled onto the floor of the truck or car and then held against endwise displacement by chocks 21 and 22 respectively, provided with flanges 21a and 22a which engage the flanged ends of the spool so that the chocks not only hold the spools against endwise rolling movement but also retain them against lateral displacement. Cross tie rods 21b and 22b connect the chocks 21 and 22 crosswise of the load so that flanges of the chocks may be clamped tightly against the opposite ends of the spools. After the lower row of spools has been positioned on the truck or car body, a frame structure comprising tracks 23 is disposed over the bottom row of spools with the horizontal flanges 23a of the tracks lying between the flanged edges of the upper and lower rows of spools, and the vertical flanges 23b thereof engaging the opposite ends of the spools. The vertical flanges 23b are provided with cross tie rods 24 whereby they may be drawn tightly against the opposite ends of the spools. The upper row of spools are held against endwise rolling movement through the medium of chocks 25. Latches or tie plates 26 are also provided as in the form originally described.

The method of loading and stacking with this form of frame structure will be understood from the foregoing description taken in conjunction with Figs. 4 and 5 of the drawings. After the bottom row has been loaded, it is only necessary to dispose the tracks 23 over the flanged ends of the lower row of spools, then roll the upper row of spools on the tracks against the rear chocks, then apply the front chocks, and then tighten the tracks into clamping relation with respect to the upper and lower rows of spools.

In all the forms shown, the cardinal principle followed in devising the framework has been to provide means for preventing the spools from shifting and becoming misaligned, due to vibration, jarring and in some instances, upsetting of the truck or car on which the load is carried.

The "spools" referred to herein are known in the trade as "warp beams." Thus by "spools" is meant warp beams, reels and other objects having in general a spool-shaped or when filled a generally cylindrical contour adapted to carry material susceptible of damage through shifting or misalignment of the spools.

It will be understood that certain changes in construction and design may be adopted within the scope and spirit of the invention as defined by the appended claims.

What is claimed is:

1. Apparatus for loading and stacking heavy spools of thread such as rayon tire cord and the like comprising in combination with lower and upper rows of spools disposed in superposed staggered relation, a base frame including tracks having base flanges on which the edges of the spools roll and come to rest and side flanges adapted to closely engage the opposite ends of the spools, means for chocking said spools against rolling movement on said track, the upper row of spools placed directly on the lower row with the flanges of an upper spool resting in the valley formed by two adjacent spools in the lower row, clamping side members engaging opposite ends of all the spools in the upper and lower rows of spools, and means for tightening said side members into clamping relation with said spools.

2. Apparatus for loading and stacking heavy spools of thread such as rayon tire cord and the like comprising in combination, a lower row of spools, an upper row of spools disposed on said lower row of spools, base tracks on which the lower row of spools roll and come to rest, said tracks being of angle shape providing vertical side flanges adapted to tightly engage the opposite ends of the spools, clamping members extending longitudinally of the rows against opposite ends of the upper and lower rows of spools, means for tightening said members against the adjacent ends of the upper and lower rows of spools, and means disposed near the top portion of the top row of spools and engaging between adjacent spools and functioning to prevent rolling displacement of the upper row of spools.

3. Apparatus for stacking and securing for transportation on a car or truck body heavy flanged spools of strand material such as rayon tire cord and the like and which spools are disposed in superimposed rows and have axial spindles projecting from opposite ends thereof, comprising a base track support, longitudinal members adjacent the flanges of the upper and lower rows of spools, means for clamping the flanges of the spools of the upper row in alignment with the spools of the lower row, means engaging over the opposite ends of a spindle of one of the spools of the upper row and connecting the clamping member to hold the spools of said row against longitudinal displacement, and means connecting the base track support and the end spindles of a spool of the lower row of spools for holding said latter row and the clamping means and the upper row as a unit against displacement with respect to the base support on the floor of the truck or car body.

RICHARD S. KOONCE.